United States Patent [19]
Kocer et al.

[11] Patent Number: 6,000,719
[45] Date of Patent: Dec. 14, 1999

[54] BODY BRACKET AND WELDING TECHNIQUE

[75] Inventors: Bruce D. Kocer, Oxford; Gerald R. Binder, Sterling Heights; Walter A. Snyder, Plymouth, all of Mich.

[73] Assignee: The Budd Company, Troy, Mich.

[21] Appl. No.: 08/848,352

[22] Filed: Apr. 28, 1997

[51] Int. Cl.[6] .......................... B62D 21/02; B62D 24/00; B23K 31/02
[52] U.S. Cl. ........................ 280/781; 296/29; 228/173.4; 228/182
[58] Field of Search ...................... 280/781, 797, 280/800; 296/29, 35.1, 204; 228/173.3, 173.4, 173.1, 182; 29/897.2

[56] References Cited

U.S. PATENT DOCUMENTS

| | | | |
|---|---|---|---|
| 1,517,238 | 11/1924 | Stresau . | |
| 3,479,081 | 11/1969 | Schaaf | 296/35.1 |
| 4,641,809 | 2/1987 | Beer . | |
| 4,899,843 | 2/1990 | Takano et al . | |
| 5,149,132 | 9/1992 | Ruehl et al. . | |
| 5,205,587 | 4/1993 | Orr . | |
| 5,308,115 | 5/1994 | Ruehl et al. | 280/800 |
| 5,322,208 | 6/1994 | Hinrichs et al. | 228/182 |
| 5,332,281 | 7/1994 | Janotik et al. . | |

*Primary Examiner*—Peter C. English
*Attorney, Agent, or Firm*—Harness, Dickey & Pierce, P.L.C.

[57] ABSTRACT

A body bracket is provided for attachment to a vehicle frame. The body bracket includes a top wall having an attachment hole therein. A pair of sidewalls extend from the top wall. The sidewalls include an upper end and a lower end. The sidewalls are flared such that a distance between the lower ends of the pair of sidewalls is larger than a distance between the upper ends thereof. The sidewalls have an end portion for attachment to the vehicle frame. The end portions are provided with an outward taper.

4 Claims, 3 Drawing Sheets

BODY BRACKET AND WELDING TECHNIQUE

BACKGROUND OF THE INVENTION

Field of the Invention

The present invention relates to a body bracket design and welding technique, and more particularly, to a body bracket design configured to improve strength and fatigue properties of the welded part.

BACKGROUND AND SUMMARY OF THE INVENTION

A motor vehicle frame generally includes a pair of spaced apart side rails which extend the length of a vehicle and which are connected by laterally extending cross members to form a rigid structure. Various parts, such as body mount brackets, for example, are welded to the side rails. A typical body mount bracket is generally shaped as an inverted U and includes a pair of spaced apart vertical side legs or walls and a horizontal top wall. The body mount bracket is welded to the side rail by applying a weld bead along the outer periphery of the U.

U.S. Pat. No. 5,322,208 issued to Hinrichs et al discloses a standard body bracket 10 welded to a side rail 12 of a vehicle frame 14 as shown in FIGS. 6–8. The body bracket 10 is welded to the side rail 12 by what is referred to as the "weld past" technique. The patent discloses the step of providing a first weld 16 around the periphery of the body mount bracket 10 at the seam between the bracket 10 and the side rail 12, and extending the opposite ends of the weld 16 past or beyond the lower ends of the bracket side wall portions 18. The patent also discloses the step of providing a pair of reinforcement welds 20 along the inside surface of each side wall portion 18, the reinforcement welds 20 extending past the lower ends of the side wall portions. A pair of welds 22 are also provided on the back side 24 of the side rail 12 in opposed relation directly opposite the bracket wall portions 18.

A problem with the welding technique disclosed in the Hinrichs et al patent is that the technique requires an excessive amount of welding, and the welding on the inner side of the side walls and on the back side of the side rail require complicated maneuvering by the welding gun.

The present invention provides an improved method for welding a body mount bracket or other member (such as a cross-member) to a side rail of a vehicle frame. The invention uses a body bracket having a top wall with an attachment hole therein. A pair of side walls extend from the top wall. The side walls are flared such that a distance between the lower ends of the pair of side walls is larger than a distance between the upper ends thereof. The side walls have an end portion for attachment to the vehicle frame which are provided with an outward taper. The angled relationship of the ends of the flanged portions allow an improved weld and a good geometry to be obtained between the body bracket and the side rail of the vehicle chassis.

In the known body bracket designs, the body bracket is provided with a blunt edge which is abutted against the side rail and welded to the side rail. The body bracket essentially abuts against the side rail and the side walls are provided substantially at a right angle relative thereto. In these designs, the weld that is obtained has limited strength capabilities because of a welding deficiency which is created due to the welding process thinning and thus weakening the side walls of the body bracket in the location of the weld.

Another body bracket design has utilized a flange which is disposed at ninety (90) degrees to the sidewalls of the body bracket. The body brackets according to this design do not suffer from the deficiency of wall thinning during the welding process. However, the welded brackets have a poor geometry which results in poor mechanical stiffness. The design of the present invention avoids these deficiencies because the weld can be obtained without substantially thinning the side walls of the body bracket according to the present invention and a good geometry is maintained.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

With reference to FIGS. 1–5, the present invention will now be described. With specific reference to FIG. 1, a body mount bracket 30, according to the present invention, is mounted to a side rail 32. Side rail 32 includes upper and lower generally horizontal walls 34, 36, respectively. Side rail 32 also includes first and second generally vertical side walls 38, 40.

Figure 1:
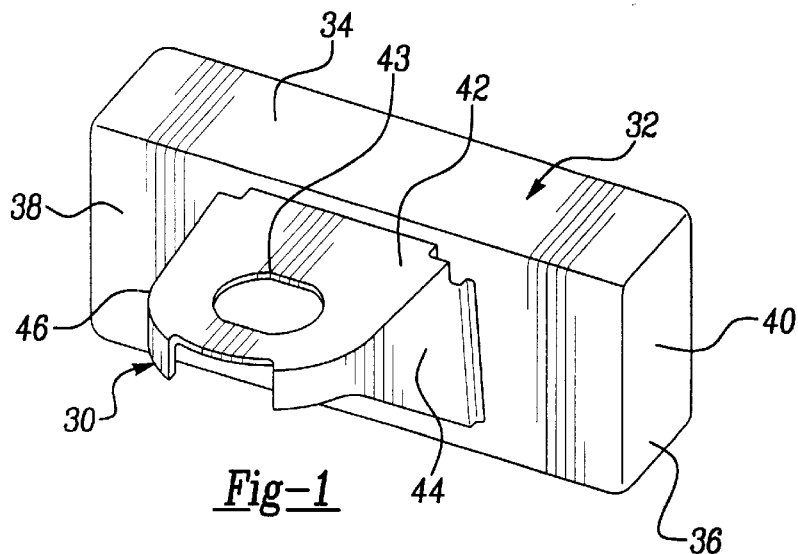
FIG. 1 is a perspective view of a body mount bracket mounted to a side rail according to the present invention.
Figure 2:
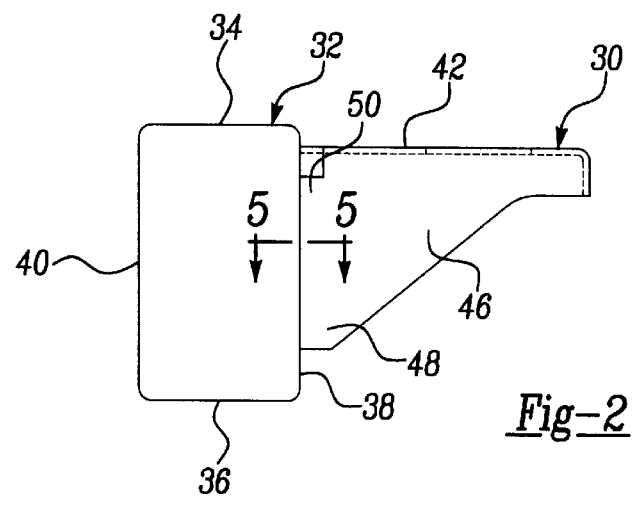
FIG. 2 is a side view of the body mount bracket mounted to a side rail according to the present invention.
Figure 3:
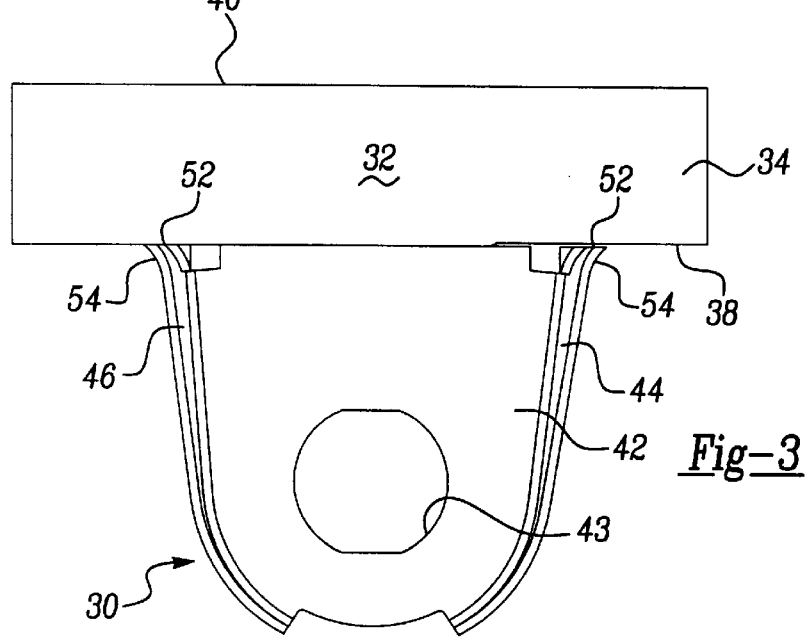
FIG. 3 is a top view of a body mount bracket mounted to a side rail according to the principles of the present invention.
Figure 4:
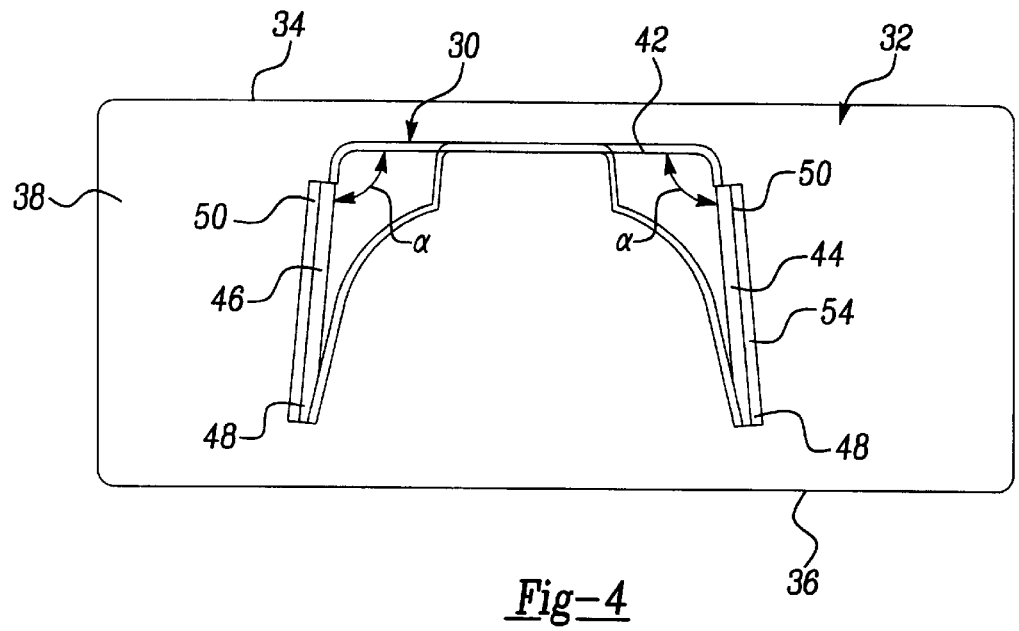
FIG. 4 is a front view of the body mount bracket mounted to a side rail according to the present invention.
Figure 5:
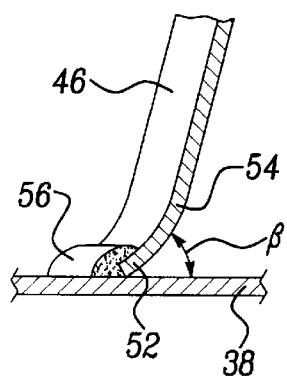
FIG. 5 is a cross-sectional view taken along line 5—5 of FIG. 2 illustrating the outward taper of the end portions of the side walls.

Body bracket 30 is welded to vertical side wall 38. Body bracket 30 includes a top wall 42 and a pair of side wall portions 44, 46. Top wall 42 includes an attachment hole 43 for mounting a vehicle body to the bracket. Side wall portions 44, 46 extend downwardly from top wall 42. Side wall portions 44, 46 flare outward such that a distance between lower ends 48 of the side walls 44, 46 is larger than a distance between upper ends 50 thereof. Preferably, the angle a between flared side wall portions 44, 46 and top wall 42 is between 93° and 98°. Side walls 44, 46 are also provided with end portions 52 for attachment to the side rail 32 of the vehicle frame. End portions 52 are provided with an outward taper 54. With reference to FIG. 5, the end portion 52 of flared side wall portion 46 is shown welded to vertical side wall 38 of side rail 32 at an angle B. Angle B is, preferably, between 10° and 70°. The weld bead portion 56 is disposed on the outward side of sidewall portions 44, 46.

The configuration of the body bracket 30 of the present invention provides a good structural geometry as well as permitting a good weld to be obtained. In particular, when the weld bead portion 56 is applied, little or no wall thinning is obtained at the location of the weld because the outward taper 54 of the side walls 44, 46 allow easy access of the weld gun to the intersection of the end portion 52 of the body bracket with the side rail 32. In addition, the outward flare of sidewall portions 44, 46 eliminate a "hinging" or stiffness problem associated with typical 90 degree joints. The end portion 52 of flared sidewall portions 44, 46 can be formed at an angle to allow the flange to sit flush against the rails.

Figure 6:
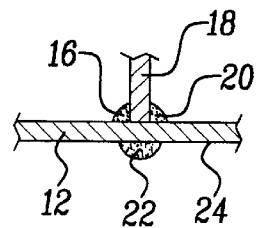
FIG. 6 is a cross-sectional view of the side walls of a body bracket welded to a vertical wall according to the prior art.
Figure 7:
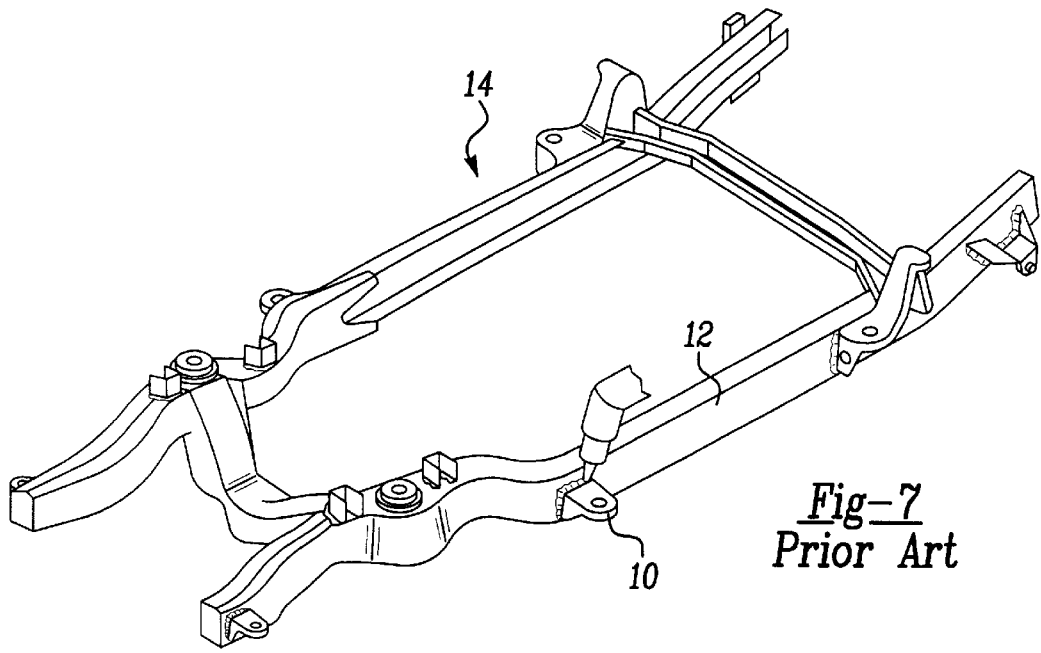
FIG. 7 is a perspective view of a vehicle frame having a body bracket mounted thereto according to the prior art.
Figure 8:
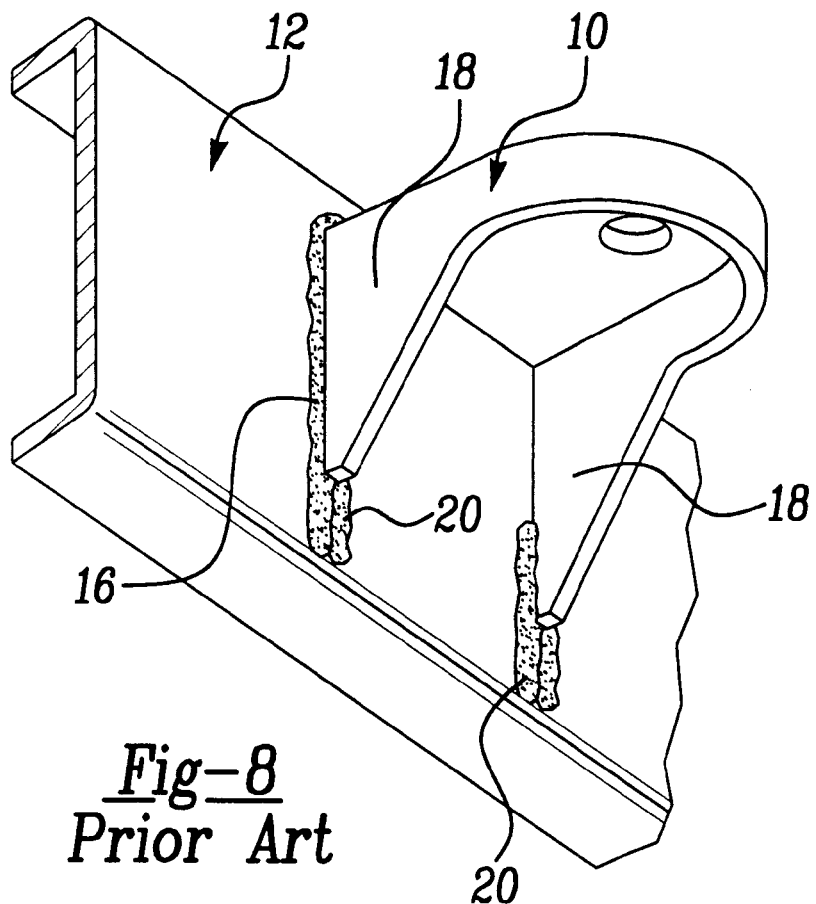
FIG. 8 is a perspective view of a body mount bracket welded to a side rail according to the prior art.

In the prior art technique shown in FIG. 6, a weld gun is not capable of easily accessing the joint between the side wall 18 of the body bracket and the side wall of the rail 12. Accordingly, during a welding process, the welding process creates a thinning of the side wall in the location of the joint, thus weakening the joint.

Figure 9:
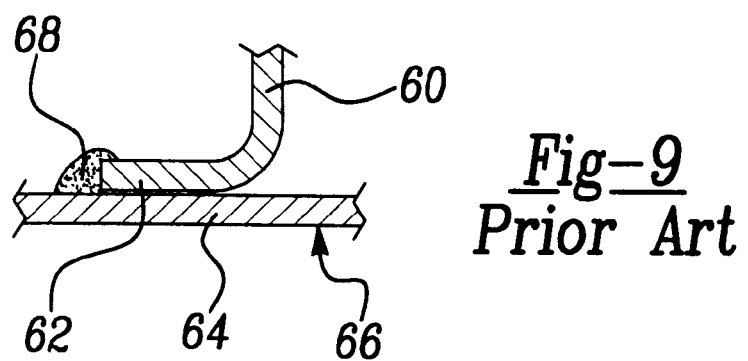
FIG. 9 is a cross-sectional view of a bracket side wall welded to a vertical wall of a side rail according to the prior art, the side wall being provided with a flange portion which extends generally parallel to the vertical wall.

With reference to FIG. 9, a second prior art welding technique is illustrated wherein the side wall 60 of a bracket is provided with a flange 62 which extends parallel with the side wall 64 of the side rail 66 to which it is welded. The flange 62 is generally perpendicular to the side wall 60 of the bracket. A weld bead 68 is applied to the end of the flange 62. This configuration allows for a good weld but has a poor geometry as a body bracket for supporting the weight of the body on the vehicle frame.

The body bracket design of the present invention provides flared side wall portions which distribute forces in both the vertical and horizontal directions. The prior art body bracket designs are primarily designed for vertical support in that the side walls of the bracket are abutted against the side rail in a generally perpendicular fashion. Thus, the prior art body bracket designs require excessive welding along the inner and outer surfaces of the side walls to provide proper support. Because of its unique design, the body bracket of the present invention requires only a single weld bead along the outer surface of each of the side wall portions 44, 46 and thus provides sufficient vertical and horizontal structural support. Accordingly, the present invention provides a body bracket design and welding technique which reduces the amount of welding necessary for supporting the body bracket on a vehicle frame. Thus, the time and expense for mounting body brackets to a vehicle frame are greatly reduced.

It should be understood that the welding technique of the present invention can be applied to other members which are welded to a generally flat surface. In particular, a cross-member may be welded to a side rail utilizing the above-described welding technique without departing from the spirit and scope of the present invention. The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A body bracket for attachment to a vehicle frame by welding, comprising:

a top wall having an attachment hole therein;

a pair of side walls extending from said top wall, said side walls having an upper end and a lower end, said side walls being flared such that a distance between said lower ends of said pair of side walls is larger than a distance between said upper ends thereof;

wherein said side walls have an end portion adapted for attachment to said vehicle frame, said end portions being provided with an outward taper, said end portions being adapted to have an angle relative to said vehicle frame between 10 and 70 degrees.

2. The body bracket according to claim 1, wherein said side walls extend from said top wall at an angle between 93 and 98 degrees.

3. A method of welding a bracket to a vehicle frame comprising the steps of:

providing a bracket having a top wall and a pair of side walls extending from said top wall, said side walls having an upper end and a lower end, said side walls being flared such that a distance between said lower ends of said pair of side walls is larger than a distance between said upper ends thereof, wherein said side walls include an end portion for attachment to said vehicle frame, said end portions being provided with an outward taper;

supporting said end portions of said side walls against said vehicle frame wherein an angle of said end portions relative to said vehicle frame is between 10 and 70 degrees; and welding said end portions to said vehicle frame.

4. A vehicle frame comprising:

a side rail;

a body bracket attached to said side rail, said body bracket including a top wall having an attachment hole therein, a pair of side walls extending from said top wall, said walls having an upper end and a lower end, said side walls being flared such that a distance between said lower ends of said pair of side walls is larger than a distance between said upper ends thereof;

wherein said side walls have an end portion attached to said side rail, said end portions being provided with an outward taper, an angle of said end portions relative to said side rail being between 10 and 70 degrees.

* * * * *